Figure 2:
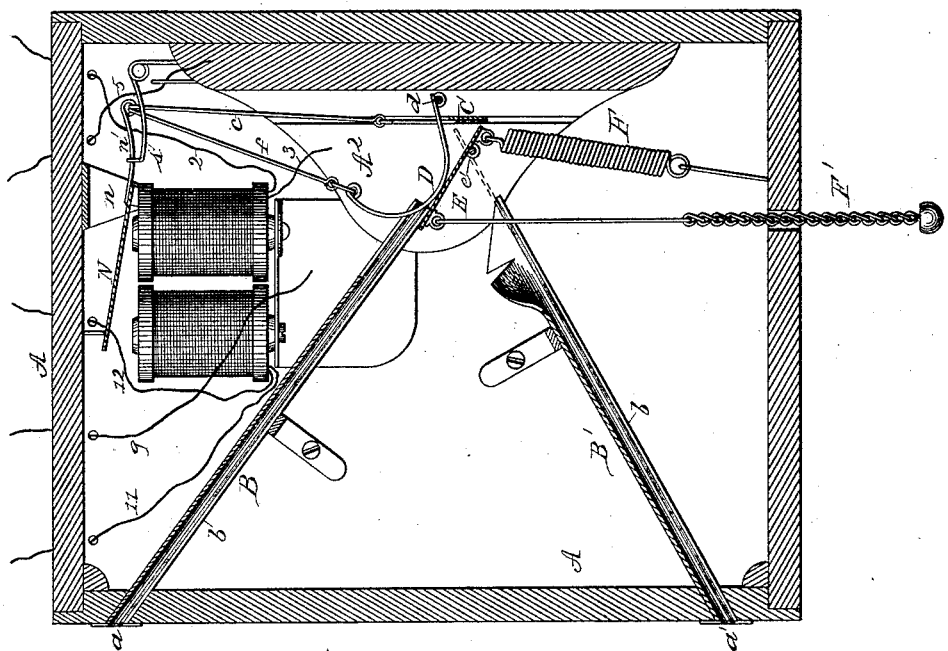

(No Model.) 2 Sheets—Sheet 1.

H. EDMUNDS & C. T. HOWARD.
TELEPHONE TOLL SYSTEM.

No. 327,073. Patented Sept. 29, 1885.

Witnesses
Wm. Kurkus Jr.
Philip Mauro

Inventor
Henry Edmunds and
Charles T. Howard by
A. Pollok their attorney

N. PETERS, Photo-Lithographer, Washington, D. C.

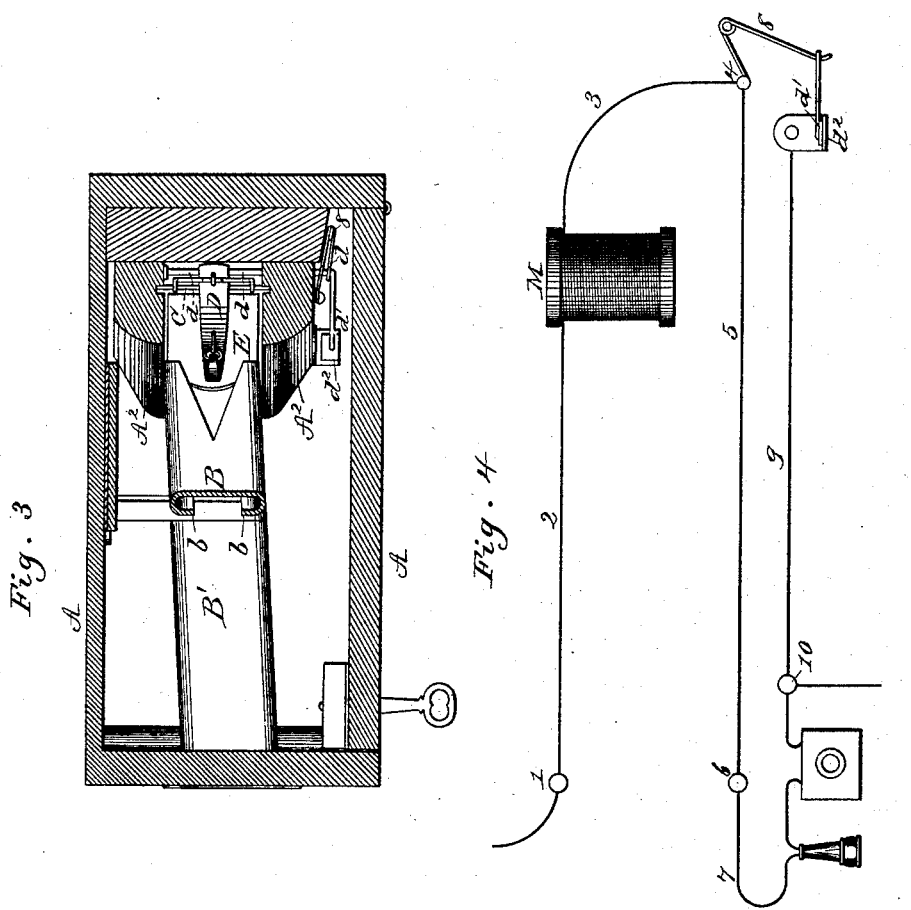

UNITED STATES PATENT OFFICE.

HENRY EDMUNDS, OF LONDON, ENGLAND, AND CHARLES T. HOWARD, OF PROVIDENCE, RHODE ISLAND.

TELEPHONE-TOLL SYSTEM.

SPECIFICATION forming part of Letters Patent No. 327,073, dated September 29, 1885.

Application filed May 13, 1885. (No model.)

*To all whom it may concern:*

Be it known that we, HENRY EDMUNDS, of London, England, and CHARLES T. HOWARD, of Providence, in the county of Providence and State of Rhode Island, have invented a new and useful Improvement in Telephone-Toll Systems, which improvement is fully set forth in following specification.

This invention has reference to systems of telephonic communication, and particularly to the ordinary central-office systems, wherein a number of subscribers' stations are located upon lines radiating from a common exchange or central office.

The general object of the invention is to render feasible the adoption of a toll system in central-office exchanges, by overcoming the difficulties and objections that have hitherto prevented such a system from being successfully maintained.

The advantages of supporting the service by a direct charge for each use of the instruments, instead of by a fixed rental, are fully recognized by those familiar with the business of carrying on a telephonic exchange. In the first place, a great loss to the telephone companies is occasioned by the unauthorized use of instruments by non-subscribers, a thing difficult or impossible to prevent. Such unauthorized use, moreover, impairs the value of the service to subscribers, and is a frequent source of complaint, as paying subscribers often find themselves cut out of the line by persons not entitled to use it. Again, the charging of a fixed rental for the use of a telephonic outfit operates unequally, inasmuch as those who use their instruments only occasionally are taxed as heavily as those by whom the telephone is in almost constant demand.
The adoption of a practical toll system would adjust the expense of the service more equitably. Furthermore, it would enable the management to cheapen the service to all legitimate subscribers, as it would levy contribution upon that large class of users which at present enjoys its telephone service free of charge.

It has been attempted heretofore to conduct the business of an exchange upon this plan by keeping at the central office a record of the number of times each instrument is used, but such system has been generally abandoned as inexpedient and impracticable. The collection of tolls is a source of difficulty and, frequently, of dispute. It requires the keeping of elaborate accounts. Moreover, there is no means of determining, otherwise than by the statement of the person calling, at which of the stations in the particular circuit the instrument in use is located. Furthermore, this plan was found not to completely avoid the annoyance and loss to subscribers from borrowing the use of their instruments.

It has also been proposed heretofore to provide the magneto-generators used for signaling with locking mechanism, so that the central office could not be signaled except by the introduction of a proper ticket or key, which unlocks the shaft of the generator, the ticket or key remaining in the box as a record of the use. Among other disadvantages which would attend the use of this device, it may be mentioned that the subscriber would thereby be charged for every time the central office is called, whether or not the line were actually used for a communication.

The present invention contemplates providing the subscribers' stations with an apparatus whereby the telephone cannot be used for the purpose of communication until a coin, of the denomination determined upon for each use of the instrument, has been actually deposited in a receptacle provided for the purpose, and whereby, also, in case the connection desired cannot be effected—as, for instance, by the line being in use—the coin deposited by the user is immediately returned.

So far as we are aware it has never before been proposed to provide the subscriber's station with mechanism whereby the instruments remain disconnected from the line until the proper coin or token is placed in its receptacle, nor to make provision for the return of the coin or token in the event of the line not being available.

The invention, besides being designed to render the establishment of a toll-system feasible, is also intended to make profitable the employment of a larger number of pay-stations in public places, in that it not only insures the payment of the proper sum, but upon the service being supplied it drops the coin paid into a locked receptacle, which is accessible only to the authorized collectors. Such an apparatus would render it practicable for local companies to allow to the controllers of pay-stations a percentage of the amounts collected, making it to their interest to see that the company is not defrauded.

In practice, the apparatus may conveniently be adapted to be operated by the five-cent nickle coin, though obviously it could be made to be operated by any other coin, or by a metal or other token specially designed for the purpose.

The invention, as reduced to practice in its preferred form, is adapted for application to telephonic exchanges already established, without necessitating any change therein further than in making the required circuit-connections. In such form of our invention we employ at each subscriber's station a box or case securely locked to prevent tampering. The telephone-instruments are normally disconnected from line, either by short-circuiting or by placing them in a disconnected branch. A switch or circuit-changer, which controls the connection of the instruments to line, is inclosed in said box. The latter has an opening of just the size and shape to admit the proper coin or token, and means are provided, as hereinafter described, to conduct said coin or token to the switch, and to divert any smaller coin or object so that it will not reach the switch. The coin or token automatically operates the switch to include the telephones in the circuit, and the subscriber can then and then only communicate his wants to the central office. So long as the coin remains in the first position it assumes on entering the box, the continuity of the circuit through the telephones is preserved. If the central office is able to make the connection desired, the operator thereat sends a current to line which energizes an electro-magnet, which is placed in the circuit with the telephones. The armature of the magnet has suitable mechanical connections whereby it releases the coin and allows it to drop into its receptacle, whence it can be recovered only by unlocking the box. This movement of the armature brings it within the attraction of a second magnet, (which may be in the local-battery circuit,) and it is held thereby as long as the circuit of the second magnet is closed. The armature is also connected with the switch or circuit-changer, so that the release of the coin does not disconnect the telephones, as would otherwise be the case. By this means, also, the central office is able to connect the telephones to line at any time (as when the station is called) without the insertion of a coin.

If the central office cannot put the caller in communication with the desired station, the user can, by the manipulation of a device provided for that purpose, release the coin and cause it to fall out of the box. The recovery of the coin is, however, virtually under the control of the central-office operator, who can take possession of it at any time in the manner specified. If desired, the apparatus can be arranged so that the direct act of the central office is required to release the coin.

If the arrangements of station apparatus usually employed are adopted, the signaling-instruments would be in the branch normally to line, while the telephones would be in a separate branch, the direction of the circuit being controlled by the well-known gravity-switch. In such case the telephone branch would itself be divided into two branches, and to connect these instruments to line it would be necessary, first, to remove the hand-telephone from its hook, and then to deposit the proper coin; but the toll-collector is as applicable to telephone systems wherein no hand-telephone or gravity-switch is employed.

The automatic switch or circuit-changer could, if preferred, be placed in the branch with the generator or signaling device by making the necessary circuit-connections.

In the accompanying drawings, which form a part of this specification, we have illustrated apparatus which may be employed in carrying the principle of the invention into effect.

Figure 1:
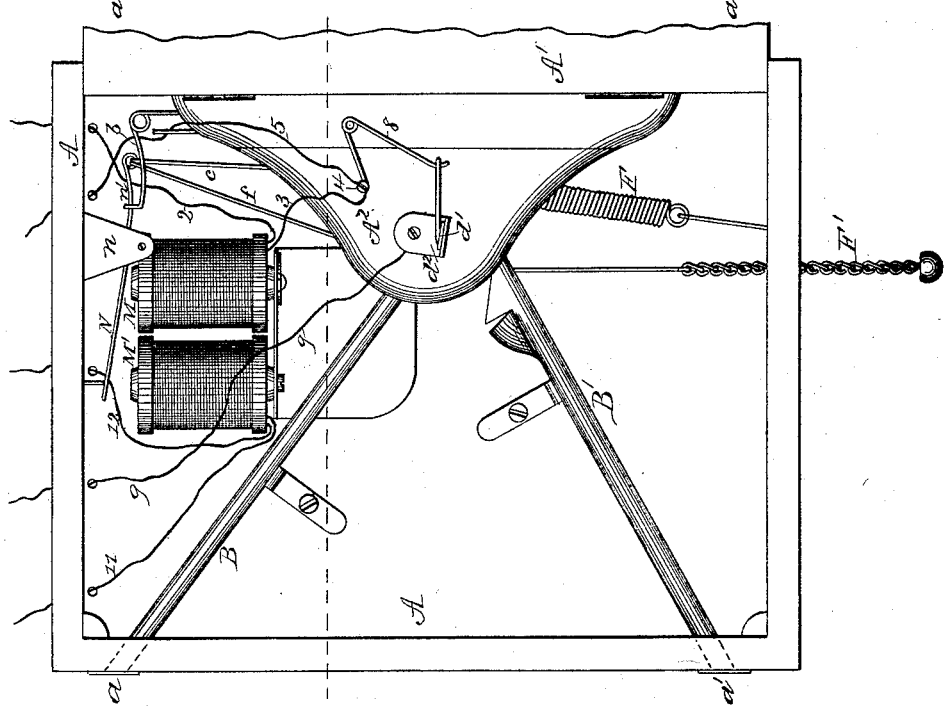

Figure 1 is an elevation of a toll-collecting box with its inclosed apparatus, the door of the box being opened. Fig. 2 is a vertical section of the same; Fig. 3, a horizontal section on line $xx$ of Fig. 1; and Fig. 4 is a diagram illustrating an arrangement of circuits.

A is the box or case of the toll-collector, which in use is closed by the door A' and securely locked. At $a$ is a slit or opening just large enough to admit the proper coin or token, so that no object of larger size could be introduced. Leading from this opening is an inclined way or passage, B. It is open on its under side, except for the narrow projecting edges $b$, so that any coin or object smaller than that agreed upon would fall through the opening to the bottom of the box.

At the lower end of the incline B is a gate or stop, C, which arrests the coin at that point.

Just above the coin, when it comes to rest, is a curved arm, D, secured to a spindle, $d$, which turns in one of the brackets $A^2$, fastened to the inside of the box or case. On the other end of spindle $d$ is a contact-maker, $d'$, which normally rests upon the stationary contact $d^2$. The arrangement of the arm D is such that when a coin or token of proper thickness comes down the incline B it lifts said arm, turns spindle $d$ sufficiently to break the contact at $d'$ $d^2$, and keeps said contacts apart as long as it is held by stop C. The device D therefore constitutes a switch or circuit-changer, which is automatically operated by the introduction of a proper coin or token.

The magnet M, which is in the main line, (or which is brought therein by the removal of the telephone from its support,) is provided with an armature, N, pivoted in the projections $n$. The lever-extension $n'$ of this armature is connected by a link, c, with the gate or stop C, the latter being capable of vertical movement in grooves in brackets O². By sending a single impulse to line the central-office operator can energize magnet M, causing it to attract its armature N. Gate or stop C is thereby raised, and the coin falls from under arm D to the bottom of the box, where, if desired, a special receptacle may be placed to receive it.

The circuit-connections of the telephone and controlling-magnet M are shown in Fig. 4. The line passes normally from post 1 by wire 2 to magnet M; thence by wires 3 and 8 to contacts $d'\ d^2$, and by wire 9 to post 10. The telephones T T' are thus short-circuited. When, however, contacts $d'\ d^2$ are separated, the line continues from magnet M to post 4, wire 5, post 6, and wire 7, through the telephones to post 10.

When the coin or token is arrested by stop C, it comes to rest upon a trap, E, which is pivoted on an axis, $e'$, and is normally held, in the position indicated by full lines, by the action of spring F. By pulling the chain F', whose end projects from the box, trap E turns upon its axis until it assumes the position indicated by dotted lines, Fig. 2, and any coin or token thereon will slide down the incline B' and out of opening $a'$. A cup or tray (not shown) may be arranged to receive the coin.

Alongside of the controlling-magnet M is a second magnet, M', which is included in the local-battery circuit, and is therefore energized whenever said circuit is closed. The current on this circuit is not sufficiently strong to enable magnet M' to attract the armature N; but when the latter has been drawn down by the action of magnet M, magnet M' can hold it in that position so long as its battery-circuit is closed. The lever-extension $n'$ of the armature is connected by a flexible connection, $f$, with the end of arm D. Therefore when the armature N is depressed the said arm will be lifted, and the contacts $d'\ d^2$ separated, thus keeping the telephones in circuit; but for this action of magnet M', the telephones would be short-circuted as soon as magnet M releases its armature.

By operating the controlling-magnet M, and bringing the armature N under the control of the auxiliary magnet M', the central office can at any time put the subscriber's telephone in line without the introduction of a coin, as when such station is called up.

The operation of the device will be readily understood. The subscriber having signaled the central office in the usual way, places the proper coin in opening $a$, and takes his telephone off its hook. The coin, sliding down track B, lifts arm D, breaking the short circuit at $d'\ d^2$, and comes to rest upon trap E. The line is now established through the telephones via post 1, wire 2, magnet M, wire 3, post 4, wire 5, post 6, and wire 7 to the telephones. The subscriber now communicates his wants to the central-office operator, who, if the person called responds, sends an impulse to line, energizing magnet M, which attracts its armature, lifts stop C, and allows the coin to continue to its receptacle. The same action of magnet M brings the armature N within the attraction of magnet M', whose circuit is now closed. Wires 11 and 12 lead from this magnet to the local battery. When this battery-current ceases to vitalize the coils of magnet M', the light spring $s$ bearing on lever $n'$ restores the stop C and arm D to their normal positions, closing the circuit at $d'\ d^2$ and cutting out the telephones. Should the central office respond that the line is in use, or that the person called does not respond, the user, by pulling on chain F' depresses trap E until it is in line with incline B', down which the coin slides to the outlet $a'$.

It will be seen that should the user operate the releasing mechanism and recover his coin at any time, the effect will be to short-circuit the telephones.

It may be desirable under some circumstances that the central office, after dropping the coin or token into its receptacle, should be able to cut out the telephones at will, as, for example, in case ex-territorial service is desired, for which an extra toll or tolls would be required. To accomplish this, it is only necessary that the controlling-magnet M should be a polarized magnet, so that after dropping the coin by sending a current of proper polarity, and thus deflecting armature N, as explained, said armature could by a reverse current be attracted in the opposite direction, and the telephone thus cut out until the additional toll has been paid. In such case the auxiliary magnet M' could of course be dispensed with.

It will be understood that the foregoing description, and the drawings referred to therein, are given merely in explanation of the manner in which the invention is or may be carried into effect, and that we do not limit ourselves to the details of construction shown and set forth, since it will be evident to persons skilled in the art that the principle of the invention can be carried out in different ways. It is also obvious that parts of the invention may, if desired, be used without others.

Having now fully described our said invention and the manner in which the same is or may be carried into effect, what we claim, and desire to secure by Letters Patent, is—

1. The combination, at a telephone-station, with the telephone or telephones located in a normally-disconnected branch, of a toll-collector comprising a closed box having a coin-opening, a switch or circuit-changer therein, and electrical connections, as specified, whereby the deposit of the proper coin or token in said opening operates said circuit-changer to connect said telephone or telephones to line, substantially as described.

2. The combination, with a telephone or telephones in a normally-disconnected branch, of a toll-collector comprising a switch or circuit-changer for putting said telephones into and out of circuit, a coin-passage leading to said switch or circuit-changer, and a stop arranged to arrest the coin at said switch or circuit-changer, substantially as described.

3. A toll-collector for telephone-stations, comprising a box or receptacle having an inlet-opening adapted for the admission of the proper coin or token, a switch operated to effect connection with the main line by the introduction of such coin or token, and an outlet and releasing mechanism whereby the coin or token may be withdrawn from said box, substantially as described.

4. In a toll-collector for telephone-lines, the combination of a closed box or receptacle having a coin-opening, an incline or track for the passage of said coin, a switch or circuit-changer controlled by the coin, a trap upon which said coin comes to rest, and means for operating said trap to conduct said coin to an outlet-opening, substantially as described.

5. A toll-collector for telephone-lines, having in a closed box or case two inclined coin passages or tracks communicating, respectively, with an inlet and an outlet, a trap normally in line with the inlet-passage, a switch or circuit-changer controlled by the coin when resting on said trap, and means for depressing said trap, so as to bring it in line with the outlet passage or track, substantially as described.

6. A toll-collector for telephone-lines comprising a closed box having a coin-inlet, an inclined way leading therefrom to a switch or circuit-changer, and a stop to arrest the coin at said switch, said stop being connected with the armature of an electro-magnet in the main line, so that at the will of the central-office operator it can be removed and the coin allowed to fall into its receptacle, substantially as described.

7. In a toll-collector for telephone-stations, the combination of a closed box having an inlet for a coin or token, a circuit-changer operated by the admission of said coin or token, means under the control of the central office for withdrawing the coin from said circuit-changer and causing it to drop into its receptacle, an outlet for the coin, and a releasing device, substantially as described.

8. The combination of the box or case having an inlet for a special coin or token, an inclined track, a switch or circuit-changer for connecting the telephone-instruments to line, a removable stop to arrest the coin in the position to operate said switch, whereby the stations can communicate with the central office so long as the coin or token is held by said stop, an electro-magnet in the main line, its armature, and connections for withdrawing said stop and dropping the coin, a trap upon which said coin comes to rest, and a releasing device under the control of the subscriber, whereby he may depress said trap to recover said coin or token, substantially as described.

9. The combination, at a subscriber's station, with the telephone, of a circuit-changer arranged to connect said telephone to line upon the admission of a proper coin or token, means, controlled by the armature of an electro-magnet in the line, for causing the coin to fall into its receptacle, a second magnet in the local circuit capable of holding said armature when brought within its reach by the action of the first-named magnet, and connections, as specified, whereby said armature, when depressed, operates said circuit-changer to keep the telephones in line, substantially as described.

10. The combination, with the switch, of the inclined track for conveying a coin thereto, said track being constructed to prevent the admission of objects larger than the proper coin or token, and being cut away below, so that smaller objects will fall through without reaching said switch, substantially as described.

In testimony whereof we have signed this specification in the presence of two subscribing witnesses.

HENRY EDMUNDS.
CHARLES T. HOWARD.

Witnesses:
HOWARD F. KING,
RICHARD H. WHITTIER.